3,324,205
HALOGENATED PHOSPHATES AND PHOSPHONATES AND METHOD OF PREPARATION

Sammy Carpenter, New City, N.Y., and Enrique R. Witt, Corpus Christi, Tex., assignors to Celanese Corporation of America, New York, N.Y., a corporation of Delaware
No Drawing. Filed Mar. 5, 1963, Ser. No. 262,833
12 Claims. (Cl. 260—963)

This invention relates broadly to new chemical compounds, to a method of making the same, and to a use thereof. More particularly the invention is concerned with halogen-containing organic compounds of phosphorus that are especially useful as flame-resisting compositions or as components of such compositions. Still more particularly the invention is concerned with chemical compounds (or, generically, a chemical compound) represented by the general formula (I) 

where A, B and C are each selected from the group consisting of

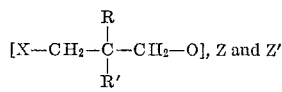

and that at least one of A, B and C is

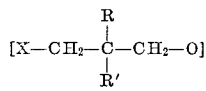

X is a halogen selected from the group consisting of chlorine and bromine;
Y is selected from the group consisting of oxygen and sulfur;
Z and Z' are each selected from the group consisting of alkyl, aryl, alkoxy, aryloxy, alkylthio and arylthio;
R and R' are each selected from the group consisting of unsaturated aliphatic hydrocarbon radicals, saturated aliphatic hydrocarbon radicals, halogenated unsaturated aliphatic hydrocarbon radicals, halogenated saturated aliphatic hydrocarbon radicals, aromatic hydrocarbon radicals, saturated ether radicals, unsaturated ether radicals, saturated ester radicals, unsaturated ester radicals, and halogenated aromatic hydrocarbon radicals. Where the radicals represented by R and R' are halogen-containing radicals, the halogen therein may be the same as or different from the halogen represented by X.

Illustrative examples of radicals represented by R and R' in Formula I are (a) the various saturated and unsaturated, including cyclic, aliphatic hydrocarbon radicals e.g., methyl, ethyl, propyl, butyl, amyl, hexyl through octadecyl (both normal and isomeric forms of said radicals) vinyl, allyl, propenyl, cyclopentyl, cyclohexyl, cycloheptyl, cyclohexenyl, etc.; (b) the various mono- and polyhalogenated (-chlorinated, -brominated, -fluorinated and -iodinated) saturated aliphatic hydrocarbon radicals corresponding to those mentioned under (a) by way of example, including the various per-halogenated saturated aliphatic hydrocarbon radicals; (c) the various aromatic hydrocarbon radicals, e.g., phenyl, mono- and poly-alkylphenyls (for instance, tolyl, xylyl, mono-, di- and triethyl, -propyl, -isopropyl, -butyl, etc., phenyls), biphenylyl or xenyl, and (d) the various mono- and poly-halogenated (-chlorinated, -brominated, -fluorinated and -iodinated) aromatic hydrocarbon radicals, especially the nuclearly mono- and poly-halogenated aromatic hydrocarbon radicals, corresponding to those mentioned under (c) by way of example.

No pertinent prior art is known. Lanham U.S. Patent No. 2,610,978 discloses the production of halogen-substituted organic phosphates, e.g., tri-(2-chloroethyl) phosphate, by reacting an oxirane compound represented by the formula (II) 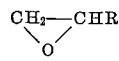

wherein R is hydrogen or an alkyl, or a chloroalkyl or a bromoalkyl radical, in the presence of a particular catalyst, with phosphorus oxychloride or oxybromide.

The present invention is based on our discovery that compounds of the kind embraced by Formula I can be prepared by effecting reaction between (A) a phosphorus thio or oxyhalide represented by the general formula (III) 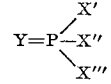

where X' is a halogen, e.g. chlorine or bromine; X'' and X''' are halogen, alkyl, aryl, alkoxy, aryloxy, alkylthio or arylthio, and Y is oxygen or sulfur; and (B) an oxetane represented by the general formula (IV) 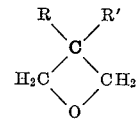

wherein R and R' have the same meanings as given above with reference to Formula I. The reactants (A') and (B) are suitably employed in ratios of at least about 1 mole of oxetane per halo equivalent in said phosphorus thio or oxyhalide. Preferably, where the phosphorus thio or oxyhalide has 3 pendant halo groups, at least about 3 moles of oxetane are employed per phosphorus containing molecule, e.g., from about 3 moles to 4, 5 or more moles of the latter per mole of the former. When more than about 3 moles of the oxetane reactant per mole of the phosphorus oxyhalide reactant are employed, the excess oxetane functions as reaction medium, or as part of the reaction medium if the reaction is carried out in the presence of an added, inert, anhydrous, liquid reaction medium. The reaction is effected at a temperature ranging between about 0° C. and the temperature of decomposition of the desired reaction product.

A compound selected from those represented by the general formulas:

(V) 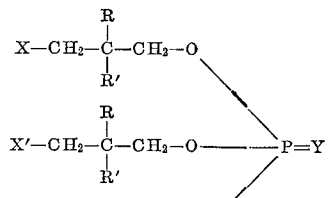

(VI) 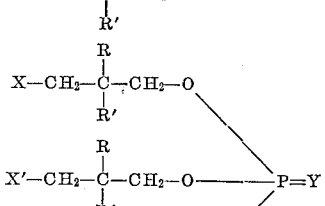

(VII) 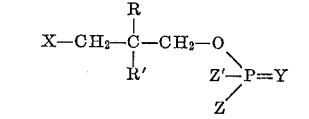

where Y is oxygen or sulfur; Z and Z' are the same or different and are alkyl, aryl, alkoxy, aryloxy, alkylthio or arylthio; X, X' and X" are the same or different and have the same meanings as set forth above; and R and R' are the same or different and have the same meanings as set forth above is made by the practice of this invention. At the end of the reaction period a compound represented by Formula V or, as represented in abbreviated form by Formula I, is isolated by any suitable means from the reaction mass.

Illustrative examples of phosphorus oxyhalides embraced by Formula III that can be used in practicing the present invention are:

Chloromethyl phosphonyl dichloride

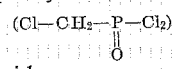

Phosphorus oxychloride
Dibutyl phosphinyl chloride

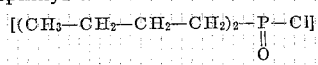

Phosphorus oxybromide
Ethyl phosphoro dichloridate

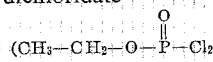

Phosphorus oxybromide dichloride, POBrCl$_2$
Diphenyl phosphoro mono chloridate

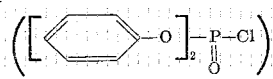

Phosphorus oxydibromide chloride, POBr$_2$Cl

Illustrative examples of oxetanes embraced by Formula IV that can be employed in practicing the present invention are:

3,3-bis(methyl through octadecyl)oxetanes
3,3 - bis(halogenomethyl through - octadecyl)oxetanes, more particularly the 3,3-bis(chloro-, bromo-, fluoro- and iodomethyl through-octadecyl)oxetanes, including the various mono- and poly-halogeno derivatives thereof
3 - (methyl through - octadecyl),3 - (halogenomethyl through-octadecyl)oxetanes, more particularly the 3-(methyl through-octadecyl),3-(chloro-, bromo-, fluoro- and iodomethyl through-octadecyl)oxetanes, including the various mono- and poly-halogeno derivatives thereof
3,3-bis(phenyl)oxetanes
3,3-bis(tolyl)oxetanes
3,3-bis(xylyl)oxetanes
3,3-bis(naphthyl)oxetanes
3-phenyl,3-chlorophenyloxetanes
3-tolyl,3-dibromotolyloxetanes
3-xylyl,3-trifluorophenyloxetanes
3-phenyl,3-iodophenyloxetanes
3,3-bis(halogenonaphthyl)oxetanes, including the various 3,3-bis(mono-, di-, tri-, tetra-, penta-, etc., chloro-, bromo-, fluoro- and iodonaphthyl)oxetanes
3-naphthyl,3(halogenonaphthyl)oxetanes, including the various 3-naphthyl,3-(mono-, di-, tri-, tetra-, penta-, etc., chloro-, bromo-, fluoro- and iodonaphtthyl)oxetanes
oxetane (1,3 propylene oxide)
2,6-dioxaspiro 3,3 heptane
3,3-bis(acetoxymethyl)oxacyclobutane
3,3-bis(allyloxymethyl)oxacyclobutane
3,3-bis(hydoxymethyl)oxetane formal
3,3-bis(hydoxymethyl)oxetane carbonate Preferably the oxetane employed is one wherein the radicals represented by R and R' in Formula IV are halogenated lower-alkyl radicals, and especially the chlorinated and/or brominated lower-alkyl radicals, e.g., methyl through amyl, inclusive (both normal and isomeric forms thereof).

The reaction between the phosphorus oxyhalide and the oxetane can be carried out in the presence or absence of an inert (substantially completely inert), anhydrous (substantially completely anhydrous), liquid reaction medium, e.g., an inert, anhydrous, liquid hydrocarbon, and in the presence or absence of a catalyst for the reaction. Preferably the reaction is effected while the reactants are contained in an inert, anhydrous, liquid medium since in this way it is easier to control the temperature of the reaction.

By "inert" or "substantially completely inert," anhydrous, liquid medium or liquid reaction medium is meant an anhydrous, liquid medium which is so inert or non-reactive toward the reactants and the reaction product that it will not affect the course of the reaction or the constitution of the reaction product. By "anhydrous" or "substantially completely anhydrous" liquid medium (or liquid reaction medium) in the foregoing sentences is meant one which contains no more than a trace of water or that which might appear in a commercial product; and by "liquid medium" (or "liquid reaction medium") is meant a medium which is liquid at the temperature and pressure employed in effecting the reaction. In other words, the inert, anhydrous, liquid medium in which the reaction advantageously is effected may or may not be a liquid at room temperature (20°–30° C.) or at any other temperature below the reaction temperature. Preferably a liquid medium which is volatile (volatilizable) without decomposition is employed.

Illustrative examples of inert, anhydrous, liquid media in which the reaction between the phosphorus oxyhalide and the oxetane can be effected include benzene, toluene, xylene, heptane, octane, nonane, decane, dodecane and higher members of the homologous series of saturated aliphatic hydrocarbons, the various halogenated saturated aliphatic hydrocarbons including, for example, chloroform, carbon tetrachloride, ethylene chloride, ethylene bromide, ethylene chlorobromide, sym. and unsym. tetrachloro- and tetrabromoethanes, 1-bromo-2-chloropropane, 2-bromo-1-chloropropane, propylene chloride, propylidene chloride and bromide, 1,1-dibromo-, 1,2-dibromo-, 1,3-dibromo- and 2,2-dibromopropanes, iobutylene bromide, 2,2-dichloropropane, trimethylene chloride, pentamethylene dichloride, the various halogenated aromatic hydrocarbons including, for example, the various chloro- and bromobenzenes and toluenes, etc. Other media include ethers, particularly those of relatively low volatility, e.g. having a boiling point at least as high as that of dioxane. Exemplary ethers include dibutyl ether, tetrahydrofuran, diglyne [CH$_3$—O—CH$_2$—CH$_2$]$_2$O, Cellosolves, e.g. butyl Cellosolve, and 2,6 dioxane. All of the foregoing illustrative examples of inert, anhydrous, liquid media in which the reaction can be effected have a boiling point of at least about 60° C. Preferably the liquid reaction medium is one that boils below about 200° C., and usually is one that boils below about 150° C., more particularly below about 100° C. Mixtures of different inert, anhydrous, liquid media can be employed in any proportions as desired or as conditions may require.

The amount of inert, anhydrous, liquid, reaction medium can be varied as desired or as conditions may require, but ordinarily the amount thereof is such that the reactants constitute from about 5% to about 80% or more by weight thereof.

It has been mentioned hereinbefore that the reaction is effected at a temperature ranging between about 0° C., and the temperature of decomposition of the desired reaction product. It is usually desirable that the temperature of the reaction does not exceed about 300° C., and preferably the temperature of the reaction does not exceed about 200° C., more particularly about 150° C. Usually the reaction is carried out at a temperature that will provide a maximum yield of product in a minimum period of time.

Then the reaction is effected while the reactants are contained in an inert, anhydrous, liquid, reaction medium, then the temperature of the reaction is usually the boiling temperature of the reaction mass at atmospheric pressure under reflux. If desired, the reaction can be carried out under superatmospheric pressure.

The reaction also can be effected in the absence of an inert, anhydrous, liquid, reaction medium. The reaction is accelerated by the addition of a suitable catalyst for the reaction.

Illustrative examples of catalysts for the reaction that can be employed, either in the presence or absence of an inert, anhydrous, liquid, reaction medium are halogen-containing compounds of titanium and of zirconium, especially the tetrahalides (tetrachlorides, tetrabromides, etc.) of titanium and zirconium. Examples of other catalysts that can be used are aluminum trichloride, aluminum tribromide, tetracresyl titanate, tetrabutoxyethyl titanate, tetrachloroethyl titanate, tetrabuyl titanate and tetraisopropyl titanate.

If a catalyst is used the amount thereof can be varied considerably, e.g., from about 0.001% to about 1 or 2% or more depending, for instance, upon the particular reactants and catalyst employed, and the temperature and other conditions of reactions.

The reaction is continued in the presence or absence of a catalyst and in the presence or absence of an inert, anhydrous, liquid, reaction medium until substantially all of the free phosphorus oxyhalide in the reaction mass has reacted with the oxetane reactant. The time of the reaction will vary widely depending, for example, upon the size of the batch, and the temperature and other conditions of reaction including the presence of absence of a catalyst, the presence or absence of an inert, liquid, reaction medium, etc. For instance, it may vary from a minute or less in bench-scale operations to 10 or 20 hours or more on a larger scale such as pilot-plant and commercial operations. The reaction may be carried out continuously, semi-continuously or by batch technique.

In order that those skilled in the art may better understand how the present invention can be carried into effect, the following examples are given by way of illustration and not by way of limitation. All parts and percentages are by weight unless otherwise specified.

*Example I*

This examples illustrates the preparation of tris[2,2,2-tris(chloromethyl)ethyl]phosphate, the formula for which is (VIII)
$$[Cl-CH_2-\underset{\underset{CH_2Cl}{|}}{\overset{\overset{CH_2Cl}{|}}{C}}-CH_2-O-]_3P=O$$

A mixture of phosphorus oxychloride, 76.3 g. (0.5 mole), 3,3-bis(chloromethyl)oxetane, 22 3g. (1.5 moles), and dry (anhydrous) benzene (500 ml.) is refluxed for 1 hour. The reaction mass is then stripped of light ends to a pot temperature of 100° C. at 1 mm. HgA. There remains in the pot 144 g. of a pale yellow, viscous oil comprising tris[2,2,2-tris(chloromethyl)ethyl]phosphate.

*Analysis.*—Theoretical, percent: Cl, 50.3; P, 5.0. Found, percent: Cl, 50.3; P, 5.8.

*Example II*

Tris[2,2,2-tris(bromomethyl) ethyl]phosphate is prepared as described under Example I with the exception that instead of the reactants employed in that example there are used 0.5 mole of phosphorus oxybromide and 1.5 moles of 3,3-bis(bromomethyl)oxetane.

*Example III*

This example illustrates the preparation of tris-[2,2-diphenyl, 2-(chloromethyl)ethyl]phosphate, the formula for which is (IX)
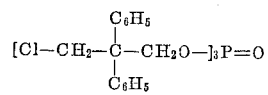

Essentially the same procedure is followed as described under Example I with the exception that 1.5 moles of 3,3-bis-phenyloxetane is used instead of 1.5 moles of 3,3-bis(chloromethyl)oxetane, 500 ml. of anhydrous toluene is employed in place of 500 ml. of anhydrous benzene, and the time of heating under reflux at the boiling temperature of the reaction mass or so-called "reflux time" is 2 hours instead of 1 hour.

In a similar manner the following compounds of the invention are prepared from the corresponding oxetane.

| Oxetane reactant: | Phosphate |
|---|---|
| 3,3-bis-p-chlorophenyl-oxetane | Tris-[2,2-(p-chlorophenyl), 2-(chloromethyl) ethyl] phosphate. |
| 3,3-bis-amyloxetane | Tris-[2-amyl,2-(chloromethyl)heptyl]phosphate. |
| 3-methyl-3-phenyl-oxetane | Tris-[2-methyl,2-phenyl, 2-(chloromethyl)]phosphate. |

Instead of 3,3-bis-p-chlorophenyloxetane one can use any of the other 3,3-bis-mono- and polyhalogenated (brominated, fluorinated and iodinated) phenyl and other halogenated aryl oxetanes. In place of 3,3-bis-amyloxetane one can use any of the 3,3-bis-substituted oxetanes wherein the substituent is a saturated aliphatic hydrocarbon radical above or below amyl in the homologous series. Similarly, instead of the 3-methyl-3-phenyloxetane the oxetane can be one wherein the substituent, in place of methyl, is a saturated cycloaliphatic hydrocarbon radical (e.g., cyclopentyl, cyclohexyl, etc.) or a straight-chain or a branched-chain saturated aliphatic hydrocarbon radical above methyl in the homologous series; and the substituent, in place of phenyl, is tolyl, xylyl, or any of the other aryl or halogenated aryl radicals hereinbefore mentioned by way of example.

The corresponding 2-(bromomethyl)ethyl phosphates are obtained by using 0.5 mole of POBr$_3$ in place of 0.5 mole of POCl$_3$ as in Example III.

Unsymmetrical tri-substituted phosphate esters are produced, for example, by employing 0.5 mole of POBrCl$_2$ or POBr$_2$Cl in place of 0.5 mole of POCl$_3$ or POBr$_3$ in any of the foregoing examples. The formulas for such unsymmetrical esters will be apparent to those skilled in the art from a consideration of the formulas hereinbefore given.

*Example IV*

This example illustrates the preparation of a phosphate of the kind described under Example I (Formula VIII) using a catalyst for the reaction and in the absence of an inert, anhydrous, liquid, reaction medium.

Phosphorous oxychloride, 76.3 g. (0.50 mole), 3,3-bis(chloromethyl)oxetane, 233 g. (1.5 moles), and a catalyst for the reaction, specifically titanium tetrachloride, 0.61 g., are heated together at 80° C. for 1 hour and then heated to 140° C. At this higher temperature the reaction become highly exothermic and the temperature of the reaction mass rises to 300° C. From the reaction mass 146 g. of crude, off-white crystals comprising tris[2,2,2-tris(chloromethyl)ethyl]phosphate is obtained by crystallization from an acetone-heptane solvent. The crude crystals are recrystallized from heptane to give 97 g. of white crystals having a M.P. of 106.4–108.6° C. and which show the following upon analysis:

Theoretical for tris[2,2,2-tris(chloromethyl)ethyl]phosphate, percent: Cl, 50.3; P, 5.0; C, 29.2; H, 3.9. Found, percent: Cl, 49.8; P, 5.7; C, 33.8; H, 4.6.

A portion (60 g.) of the recrystallized material is dissolved in benzene (200 ml.), washed first with dilute potassium permanganate solution with no reduction of the permanganate, and then with 2 weight percent of sodium hydroxide solution. An equal volume of heptane is added, whereupon 40 g. of white crystals are obtained that analyze as follows:

Theoretical for tris[2,2,2-tris(chloromethyl)ethyl]phosphate, percent: Cl, 50.3; P, 5.0; C, 29.2; H, 3.9. Found, percent: Cl, 50.5; P, 5.1; C, 30.3; H, 3.9.

*Example V*

A piece of filter paper, more particularly cellulosic filter paper, is coated and impregnated by immersing it in a small amount of the molten phosphate of Example IV as finally purified. The treated filter paper is self-extinguishing when removed from a flame.

Similar results are obtained from other articles of manufacture comprising a flame-resisting material comprising a normally flammable, organic material having at least on its external surfaces thereof a flame-resisting coating which includes essentially tris[2,2,2-tris(chloromethyl)ethyl]phosphate or other compound of the kind embraced by Formula I. Examples of materials which may be rendered flame-resistant by coating (or both coating and impregnating) a normally flammable organic material are in addition to the various organic papers (both natural and synthetic), such materials as organic polymeric and plastic materials of all kinds, natural and synthetic fibrous materials of all kinds, including cotton, wool, silk, linen, rayons, cellulose acetate fibers, acrylic fibers, polyester fibers, nylon, polyolefine fibers including polypropylene fibers, and organic resinous and polymeric materials including, for example, urea-aldehyde resins, melamine-aldehyde resins, urea-melamine-aldehyde resins, phenol-aldehyde resins, alkyd resins, the various vinyl-type polymeric materials (both homopolymers and copolymers) including those comprised or composed of homopolymers and copolymers of acrylonitrile, styrene, vinyl acetate, vinyl and vinylidene halides including the chlorides, fluorides, etc., butadiene, isoprene, etc. The phosphate esters of this invention can be incorporated into such resinous or polymeric materials during their preparation or formulation into molding, coating, laminating, etc., compositions; or they can be used upon the applied or shaped material as a coating (or both coating an impregnant therefor) in order to impart flame-resisting characteristics thereto.

It is to be understood that the foregoing detailed description is given merely by way of illustration and that many variations may be made therein without departing from the spirit of our invention.

Having described our invention what we desire to secure by Letters Patent is:

1. A chemical compound of the formula

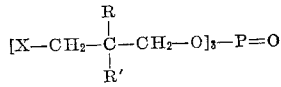

wherein X is a halogen selected from the group consisting of chlorine and bromine; R and R' are selected from the group consisting of saturated and unsaturated aliphatic hydrocarbon radicals having from 1 to 18 carbon atoms, halogenated saturated aliphatic hydrocarbon radicals having from 1 to 18 carbon atoms, aromatic hydrocarbon radicals having up to 10 carbon atoms, and halogenated aromatic hydrocarbon radicals having up to 10 carbon atoms.

2. A chemical compound of the formula

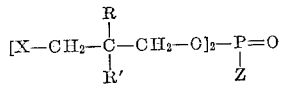

wherein X is a halogen selected from the group consisting of chlorine and bromine, Z is selected from the group consisting of alkyl and aryl radicals; R and R' are each selected from the group consisting of saturated and unsaturated aliphatic hydrocarbon radicals having from 1 to 18 carbon atoms, halogenated saturated aliphatic hydrocarbon radicals having from 1 to 18 carbon atoms, aromatic hydrocarbon radicals having up to 10 carbon atoms, and halogenated aromatic hydrocarbon radicals having up to 10 carbon atoms.

3. Tris[2,2,2-tris(chloromethyl)ethyl]phosphate.
4. Tris[2,2-diphenyl,2-(chloromethyl)ethyl]phosphate.
5. Tris - [2,2 - (p - chlorophenyl),2-(chloromethyl) ethyl]phosphate.
6. Tris - [2 - amyl,2 - (chloromethyl)heptyl]phosphate.
7. Tris - [2 - methyl,2-phenyl,2-(chloromethyl)]phosphate.
8. The method of preparing halogen-containing organic phosphorus compounds which comprises
  (1) effecting reaction between
    (A) a phosphorus oxyhalide represented by the general formula

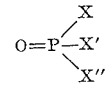

wherein X, X' and X'' represent a member of the group consisting of alkyl and aryl radicals having up to 18 carbon atoms, chlorine, and bromine, and wherein there is at least one halogen in the molecule; and
    (B) an oxetane represented by the general formula

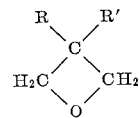

wherein R and R' represent a radical selected from the group consisting of (a) saturated and unsaturated aliphatic hydrocarbon radicals having from 1 to 18 carbon atoms, (b) halogenated saturated aliphatic hydrocarbon radicals having from 1 to 18 carbon atoms, (c) aromatic hydrocarbon radicals having up to 10 carbon atoms, and (d) halogenated aromatic hydrocarbon radicals having up to 10 carbon atoms,
   the reactants of (A) and (B) being employed in the ratio of at least one mole of the latter per halo equivalent of the former, and said reaction being effected under anhydrous conditions and at a temperature ranging between about 0° C. and the temperature of decomposition of the reaction product; and
  (2) isolating the reaction product from the resulting reaction mass.

9. A method as in claim 8 wherein the reaction is effected in an inert, anhydrous, liquid reaction medium and at a temperature ranging between about 0° C. and the boiling temperature of the reaction mass.

10. A method as in claim 8 wherein the liquid reaction medium is an inert, anhydrous, liquid hydrocarbon.

11. A method as in claim 10 wherein the liquid hydrocarbon is benzene.

12. The method of preparing tris[2,2,2-tris(chloromethyl)ethyl]phosphate which comprises effecting reaction, in a liquid reaction medium comprising anhydrous benzene, between phosphorus oxychloride and 3,3-bis(chloromethyl)oxetane in the ratio of 1 mole of the former to about 3 moles of the latter, said reaction being effected under reflux at the boiling temperature of the reaction mass; and isolating tris[2,2,2-tris(chloromethyl)ethyl]phosphate from the resulting reaction mass.

References Cited

UNITED STATES PATENTS

| | | | |
|---|---|---|---|
| 2,660,542 | 11/1953 | Walter et al. | 117—136 |
| 2,660,543 | 11/1953 | Walter et al. | 117—136 |
| 2,716,657 | 8/1955 | Bretschneider | 260—461 |
| 2,947,773 | 8/1960 | Allen | 260—461 |
| 3,132,169 | 5/1964 | Birum et al. | 260—963 X |

CHARLES B. PARKER, *Primary Examiner.*

FRANK M. SIKORA, RICHARD L. RAYMOND,
*Assistant Examiners.*